(12) United States Patent
Tazbaz et al.

(10) Patent No.: US 10,174,534 B2
(45) Date of Patent: Jan. 8, 2019

(54) MULTI-PIVOT HINGE

(71) Applicant: Microsoft Technology Licensing, LLC, Redmond, WA (US)

(72) Inventors: Errol Mark Tazbaz, Bellevue, WA (US); Brian Bitz, Sherwood, OR (US); John Campbell, Puyallup, WA (US); Bonggwon Ji, Hangzhou (CN); Jeff Liao, Hangzhou (CN); Jingjiang Zhang, Hangzhou (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/606,979

(22) Filed: Jan. 27, 2015

(65) Prior Publication Data

US 2016/0215541 A1 Jul. 28, 2016

(51) Int. Cl.
| | |
|---|---|
| *E05D 3/06* | (2006.01) |
| *E05D 3/14* | (2006.01) |
| *E05D 7/00* | (2006.01) |
| *G06F 1/16* | (2006.01) |
| *H04M 1/02* | (2006.01) |

(52) U.S. Cl.
CPC .............. *E05D 3/14* (2013.01); *E05D 7/00* (2013.01); *G06F 1/1616* (2013.01); *G06F 1/1681* (2013.01); *H04M 1/022* (2013.01)

(58) Field of Classification Search
CPC .... E05D 3/06; E05D 3/14; E05D 7/00; E05D 3/16
See application file for complete search history.

(56) References Cited

U.S. PATENT DOCUMENTS

| 3,289,877 A | 12/1966 | Hans |
| 4,355,666 A | 10/1982 | Torii |
| (Continued) | | |

FOREIGN PATENT DOCUMENTS

| CN | 103291737 A | 9/2013 |
| CN | 203669484 U | 6/2014 |
| (Continued) | | |

OTHER PUBLICATIONS

"Finger Protecta", Jul. 3, 2011, retrieved from <<http://shop.stormflame.com/finger-protecta-142-p.asp>> on Sep. 9, 2014, 2 pages.

(Continued)

*Primary Examiner* — Emily M Morgan
(74) *Attorney, Agent, or Firm* — Rainier Patents, P.S.

(57) ABSTRACT

The description relates to devices, such as computing devices that have hinged portions. One example can include a first portion and a second portion. This example can also include a sequential multi-pivot hinge assembly rotatably securing the first portion and the second portion. The sequential multi-pivot hinge assembly can include a first set of links configured to control a relative order of rotation around individual axes of rotation of the sequential multi-pivot hinge assembly when the first and second portions are being rotated away from one another and a second different set of links configured to control the relative order of rotation around the individual axes of rotation of the sequential multi-pivot hinge assembly when the first and second portions are being rotated toward one another.

14 Claims, 10 Drawing Sheets

(56) References Cited

U.S. PATENT DOCUMENTS

| | | | |
|---|---|---|---|
| 4,611,710 A | 9/1986 | Mitsufuji | |
| 4,617,699 A | 10/1986 | Nakamura | |
| 4,711,046 A | 12/1987 | Herrgord | |
| 4,845,809 A | 7/1989 | Pillifant, Jr. | |
| 5,056,192 A | 10/1991 | Grass | |
| 5,229,921 A | 7/1993 | Bohmer | |
| 5,448,799 A | 9/1995 | Stein, Jr. | |
| 5,456,195 A | 10/1995 | Ozaku et al. | |
| 5,509,590 A | 4/1996 | Medeiros, Jr. | |
| 5,796,575 A | 8/1998 | Podwalny et al. | |
| 5,845,366 A | 12/1998 | Kuroda | |
| 5,987,704 A | 11/1999 | Tang | |
| 6,223,393 B1* | 5/2001 | Knopf | G06F 1/1681 |
| | | | 16/366 |
| 6,421,235 B2 | 7/2002 | Ditzik | |
| 6,470,532 B2 | 10/2002 | Rude | |
| 6,505,382 B1 | 1/2003 | Lam et al. | |
| 6,527,036 B1 | 3/2003 | Welsh | |
| 6,754,081 B2 | 6/2004 | Rude et al. | |
| 6,757,160 B2 | 6/2004 | Moore et al. | |
| 6,831,229 B1 | 12/2004 | Maatta et al. | |
| 6,952,861 B2 | 10/2005 | Ynosencio | |
| 6,966,435 B2 | 11/2005 | Weiser et al. | |
| 7,140,074 B2 | 11/2006 | Han et al. | |
| 7,155,266 B2 | 12/2006 | Stefansen | |
| 7,227,741 B2 | 6/2007 | Garel et al. | |
| 7,251,129 B2 | 7/2007 | Lee et al. | |
| 7,293,380 B2 | 11/2007 | Repecki | |
| 7,418,766 B2 | 9/2008 | Nelson et al. | |
| 7,520,025 B2 | 4/2009 | Hung | |
| 7,584,524 B2 | 9/2009 | Jung | |
| 7,636,985 B2 | 12/2009 | Greenbank | |
| 7,758,082 B2 | 7/2010 | Weigel et al. | |
| 7,966,694 B2 | 6/2011 | Estlander | |
| 8,024,843 B2 | 9/2011 | Endo et al. | |
| 8,032,988 B2 | 10/2011 | Lai et al. | |
| 8,122,970 B2 | 2/2012 | Palen | |
| 8,170,630 B2 | 5/2012 | Murayama et al. | |
| 8,441,791 B2 | 5/2013 | Bohn et al. | |
| 8,451,601 B2 | 5/2013 | Bohn et al. | |
| 8,467,838 B2 | 6/2013 | Griffin et al. | |
| 8,590,857 B2 | 11/2013 | Chen et al. | |
| 8,624,844 B2 | 1/2014 | Behar et al. | |
| 8,649,166 B2 | 2/2014 | Wu | |
| 8,687,354 B2 | 4/2014 | Uchiyama et al. | |
| 8,687,359 B2 | 4/2014 | Theobald et al. | |
| 8,713,759 B2* | 5/2014 | Cai | G06F 1/1681 |
| | | | 16/366 |
| 8,743,538 B2 | 6/2014 | Ashcraft et al. | |
| 8,776,319 B1 | 7/2014 | Chang et al. | |
| 8,796,524 B1 | 8/2014 | Deck | |
| 8,797,727 B2 | 8/2014 | Ashcraft et al. | |
| 8,804,324 B2 | 8/2014 | Bohn et al. | |
| 8,826,495 B2 | 9/2014 | Jauvtis et al. | |
| 8,843,183 B2 | 9/2014 | Griffin et al. | |
| 8,854,834 B2 | 10/2014 | O'Connor et al. | |
| 9,047,055 B2 | 6/2015 | Song | |
| 9,243,432 B2 | 1/2016 | Lee | |
| 9,268,372 B1 | 2/2016 | Hsu | |
| 9,290,976 B1 | 3/2016 | Horng | |
| 9,371,676 B2 | 6/2016 | Rittenhouse | |
| 9,411,365 B1 | 8/2016 | Tanner et al. | |
| 9,625,947 B2 | 4/2017 | Lee et al. | |
| 9,625,953 B2 | 4/2017 | Bitz et al. | |
| 9,625,954 B2 | 4/2017 | Campbell et al. | |
| 2004/0091101 A1 | 5/2004 | Park et al. | |
| 2004/0266239 A1 | 12/2004 | Kurokawa | |
| 2005/0122671 A1* | 6/2005 | Homer | G06F 1/1618 |
| | | | 361/679.27 |
| 2005/0155182 A1 | 7/2005 | Han et al. | |
| 2006/0005356 A1 | 1/2006 | Amano et al. | |
| 2006/0046792 A1 | 3/2006 | Hassemer et al. | |
| 2006/0079277 A1 | 4/2006 | Ditzik | |
| 2007/0039132 A1 | 2/2007 | Jung et al. | |
| 2007/0049376 A1 | 3/2007 | Cho et al. | |
| 2007/0107163 A1 | 5/2007 | Barnett | |
| 2007/0117600 A1 | 5/2007 | Robertson et al. | |
| 2007/0247799 A1 | 10/2007 | Nie et al. | |
| 2008/0112113 A1 | 5/2008 | Sawadski et al. | |
| 2008/0174089 A1 | 7/2008 | Ekberg | |
| 2008/0250604 A1 | 10/2008 | Chen et al. | |
| 2009/0147458 A1 | 6/2009 | Wang et al. | |
| 2010/0154171 A1 | 6/2010 | Lee et al. | |
| 2010/0232100 A1* | 9/2010 | Fukuma | F16G 13/18 |
| | | | 361/679.01 |
| 2011/0000136 A1* | 1/2011 | Brun | E05D 3/06 |
| | | | 49/358 |
| 2011/0099756 A1 | 5/2011 | Chen | |
| 2011/0177850 A1 | 7/2011 | Griffin et al. | |
| 2011/0292605 A1 | 12/2011 | Chen | |
| 2012/0046076 A1 | 2/2012 | Masser et al. | |
| 2012/0120618 A1 | 5/2012 | Bohn | |
| 2012/0120627 A1 | 5/2012 | O'connor et al. | |
| 2012/0127471 A1 | 5/2012 | Urushidani | |
| 2012/0137471 A1 | 6/2012 | Kujala | |
| 2012/0147542 A1 | 6/2012 | Kim | |
| 2012/0206893 A1 | 8/2012 | Bohn et al. | |
| 2012/0272481 A1 | 11/2012 | Ahn et al. | |
| 2012/0279014 A1 | 11/2012 | Carlsson et al. | |
| 2012/0307472 A1 | 12/2012 | Bohn et al. | |
| 2013/0014346 A1 | 1/2013 | Ahn et al. | |
| 2013/0046492 A1 | 2/2013 | Westergaard | |
| 2013/0081229 A1 | 4/2013 | Hirano | |
| 2013/0111704 A1 | 5/2013 | Mitsui | |
| 2013/0135809 A1 | 5/2013 | Uchiyama et al. | |
| 2013/0139355 A1 | 6/2013 | Lee et al. | |
| 2013/0152342 A1 | 6/2013 | Ahn et al. | |
| 2013/0194741 A1 | 8/2013 | Uchiyama et al. | |
| 2013/0216740 A1 | 8/2013 | Russell-Clarke | |
| 2013/0219663 A1 | 8/2013 | Cai | |
| 2013/0318746 A1 | 12/2013 | Kuramochi | |
| 2014/0042293 A1 | 2/2014 | Mok et al. | |
| 2014/0084772 A1 | 3/2014 | Zhang et al. | |
| 2014/0111954 A1 | 4/2014 | Lee et al. | |
| 2014/0126133 A1 | 5/2014 | Griffin et al. | |
| 2014/0160055 A1 | 6/2014 | Margolis et al. | |
| 2014/0174226 A1 | 6/2014 | Hsu et al. | |
| 2014/0174227 A1* | 6/2014 | Hsu | E05D 3/14 |
| | | | 74/98 |
| 2014/0196253 A1 | 7/2014 | Song et al. | |
| 2014/0196254 A1 | 7/2014 | Song | |
| 2014/0217875 A1 | 8/2014 | Park | |
| 2014/0226275 A1 | 8/2014 | Ko et al. | |
| 2014/0239065 A1 | 8/2014 | Zhou et al. | |
| 2014/0245569 A1 | 9/2014 | Cho | |
| 2014/0246354 A1 | 9/2014 | Probst et al. | |
| 2014/0287804 A1 | 9/2014 | Bohn et al. | |
| 2014/0290008 A1 | 10/2014 | Hsu | |
| 2014/0290009 A1 | 10/2014 | Kasai et al. | |
| 2014/0338483 A1 | 11/2014 | Hsu et al. | |
| 2014/0352757 A1 | 12/2014 | Ramirez | |
| 2014/0360296 A1 | 12/2014 | Hsu | |
| 2015/0016040 A1 | 1/2015 | Hood et al. | |
| 2015/0092331 A1 | 4/2015 | Kinoshita et al. | |
| 2015/0138103 A1 | 5/2015 | Nishi | |
| 2015/0138712 A1 | 5/2015 | Solland | |
| 2015/0153787 A1 | 6/2015 | Mok et al. | |
| 2015/0176317 A1* | 6/2015 | Lee | E05D 3/06 |
| | | | 16/251 |
| 2015/0227175 A1 | 8/2015 | Motosugi | |
| 2015/0277505 A1 | 10/2015 | Lim et al. | |
| 2015/0277506 A1 | 10/2015 | Cheah et al. | |
| 2015/0361696 A1 | 12/2015 | Tazbaz | |
| 2015/0362956 A1 | 12/2015 | Tazbaz | |
| 2015/0370287 A1 | 12/2015 | Ko et al. | |
| 2016/0132075 A1 | 5/2016 | Tazbaz | |
| 2016/0132076 A1 | 5/2016 | Bitz et al. | |
| 2016/0139634 A1 | 5/2016 | Cho et al. | |
| 2016/0139639 A1 | 5/2016 | Dash et al. | |
| 2016/0147267 A1 | 5/2016 | Campbell et al. | |
| 2016/0187935 A1 | 6/2016 | Tazbaz et al. | |
| 2016/0201367 A1 | 7/2016 | Kato | |
| 2016/0215541 A1 | 7/2016 | Tazbaz et al. | |
| 2016/0224072 A1 | 8/2016 | Huang et al. | |

(56) References Cited

U.S. PATENT DOCUMENTS

| | | |
|---|---|---|
| 2016/0349802 A1 | 12/2016 | Ahn et al. |
| 2016/0357226 A1 | 12/2016 | Campbell et al. |
| 2017/0090523 A1 | 3/2017 | Tazbaz et al. |
| 2018/0059735 A1 | 3/2018 | Tazbaz et al. |
| 2018/0066465 A1 | 3/2018 | Tazbaz et al. |

FOREIGN PATENT DOCUMENTS

| | | | |
|---|---|---|---|
| CN | 204553530 | * | 2/2015 |
| CN | 204553530 U | | 8/2015 |
| EP | 0844357 A1 | | 5/1998 |
| EP | 1340879 A2 | | 9/2003 |
| EP | 1422593 A1 | | 5/2004 |
| EP | 1464784 A1 | | 10/2004 |
| EP | 2728433 A1 | | 5/2014 |
| EP | 2765478 A2 | | 8/2014 |
| EP | 2765479 A2 | | 8/2014 |
| KR | 20140049911 A | | 4/2014 |
| WO | 2016/077254 A1 | | 5/2016 |

OTHER PUBLICATIONS

"Fingersafe", May 26, 2013, retrieved from <<http://fingersafe.com/>> on Sep. 9, 2014, 2 pages.

"Laptop back covers shell for Dell 15R 5520 7520 M521R 5525 PN T87MC laptop hinge cover", retrieved from <<http://www.alibaba.com/product-detail/Laptop-back-covers-shell-For-Dell_1628979107.html>> on Sep. 8, 2014, 3 pages.

"Polyprop Boxes Accessories", Jun. 28, 2013, retrieved from <<http://www.presentingbinders.co.uk/Polyprop_Boxes_Accessories.html>> on Sep. 10, 2014, 6 pages.

International Search Report and Written Opinion dated Apr. 12, 2016 from PCT Patent Application No. PCT/US2016/013815, 19 pages.

Non-Final Office Action dated Apr. 12, 2016 from U.S. Appl. No. 14/555,184, 32 pages.

Non-Final Office Action dated Feb. 22, 2016 from U.S. Appl. No. 14/538,775, 23 pages.

International Search Report dated Jan. 4, 2016 from PCT Patent Application No. PCT/US2015/059798, 13 pages.

International Search Report dated Jan. 25, 2016 from PCT Patent Application No. PCT/US2015/060959, 11 pages.

International Search Report dated Jan. 4, 2016 from PCT Patent Application No. PCT/US2015/059799, 13 pages.

"Bi-Fold Hinges", published on May 9, 2012, retrieved at: <<http://catalog.monroehinge.com/category/bi-fold-hinges>>, 1 page.

"Multi-function stainless steel hydraulic shower door pivot hinge", retrieved on Sep. 10, 2015, at <<http://www.alibaba.com/product-detail/Multi-function-stainless-steel-hydraulic-shower_60153561047.html>>, 10 pages.

"Plastic Slatband Chains", retrieved on Sep. 10, 2015, at <<http://www.irp.co.za/wp-content/assets/LFC002-7.5-Straight-Running-Double-Hinge-Chain.pdf>>, 1 page.

"Samet SoftCover hinge wins the Innovation Award 2013", Feb. 8, 2013, retrieved from <<http://www.kozsusanidesign.com/samet-softcover-hinge-wins-the-innovation-award-2013/>> on Sep. 9, 2014, 2 pages.

"Single and double hinge type LBP (820 & 821 LBP)", retrieved on Sep. 10, 2015, at <<http://www.papadopoulos-bros.gr/en/proionta/erpystries-metaforikes-tainies/erpystries/plastikes/eutheias/monou-kai-diplou-mentese-typou-lbp-820-821-lbp/>>, 1 page.

"Straight Running Chains", published on Jul. 15, 2013, retrieved at <<http://www.ultraplastindia.com/stainless-steel-slat-chains.html>>, 2 pages.

"System Plast LF 820 K400 Acetal Straight Running Chain, 4 Width, 120" Length, Single Hinge", retrieved on Sep. 10, 2015, at <<http://www.amazon.com/System-Plast-Acetal-Straight-Running/dp/B00MJXUDIA>>, 3 pages.

"Moving Point Hinge-Multipivot Hinge", retrieved on Oct. 9, 2014, <<http://websystem.gismo.se/Gismo/files/1029/2.mph%2001%20introduktion.pdf>>, 6 pages.

Elliott, Amy-Mae, "9 Nifty Laptop Feet to Keep Your PC Running Cool", Jul. 30, 2012, <<http://mashable.com/2012/07/30/laptop-feet/>>, 26 pages.

Non-Final Office Action dated Mar. 29, 2016 from U.S. Appl. No. 14/588,138, 34 pages.

International Search Report and Written Opinion dated Feb. 22, 2016 from PCT Patent Application No. PCT/US2015/064173, 13 pages.

Non-Final Office Action dated Mar. 31, 2016 from U.S. Appl. No. 14/538,786, 16 pages.

Response filed Jun. 29, 2016 to the Non-Final Office Action dated Feb. 22, 2016 from U.S. Appl. No. 14/538,775, 12 pages.

Article 34 Demand filed May 4, 2016 from PCT Patent Application No. PCT/US2015/059798, 17 pages.

Response filed Jun. 29, 2016 to the Non-Final Office Action dated Mar. 29, 2016 from U.S. Appl. No. 14/588,138, 10 pages.

Response and Demand filed Jun. 15, 2016 from PCT Patent Application No. PCT/US2015/064173, 13 pages.

Response filed Jun. 29, 2016 to the Non-Final Office Action dated Apr. 12, 2016 from U.S. Appl. No. 14/555,184, 10 pages.

Article 34 Demand filed Jun. 8, 2016 from PCT Patent Application No. PCT/US2015/060959, 14 pages.

Response filed Jun. 30, 2016 to the Non-Final Office Action dated Mar. 31, 2016 from U.S. Appl. No. 14/538,786, 12 pages.

Notice of Allowance dated Jul. 14, 2016 from U.S. Appl. No. 14/555,184, 15 pages.

Final Office Action dated Jul. 29, 2016 from U.S. Appl. No. 14/588,138, 31 pages.

Corrected Notice of Allowability dated Aug. 4, 2016 from U.S. Appl. No. 14/555,184, 16 pages.

Second Written Opinion dated Jan. 2, 2017 from PCT Patent Application No. PCT/US2016/013815, 6 pages.

Preliminary Amendment filed Sep. 26, 2016 from U.S. Appl. No. 15/239,417, 7 pages.

Response and Demand filed Apr. 6, 2016 from PCT Patent Application No. PCT/US2015/059799, 20 pages.

Response filed Jan. 3, 2017 to the Final Office Action dated Oct. 14, 2016 from U.S. Appl. No. 14/538,775, 9 pages.

Non-Final Office Action dated Jan. 6, 2017 from U.S. Appl. No. 14/866,697, 72 pages.

Corrected Notice of Allowability dated Jan. 13, 2017 from U.S. Appl. No. 14/538,786, 26 pages.

Non-Final Office Action dated Jan. 20, 2017 from U.S. Appl. No. 14/588,138, 12 pages.

Notice of Allowance dated Feb. 3, 2017 from U.S. Appl. No. 14/555,184, 18 pages.

International Preliminary Report on Patentability dated Jan. 24, 2017 from PCT Patent Application No. PCT/US2015/059799, 8 pages.

International Preliminary Report on Patentability dated Jan. 30, 2017 from PCT Patent Application No. PCT/US2015/059798, 6 pages.

Final Office Action dated Feb. 24, 2017 from U.S. Appl. No. 14/538,775, 42 pages.

Corrected Notice of Allowability dated Jan. 25, 2017 from U.S. Appl. No. 14/538,786, 6 pages.

Second Written Opinion dated Oct. 31, 2016 from PCT Patent Application No. PCT/US2015/059799, 8 pages.

Final Office Action dated Oct. 14, 2016 from U.S. Appl. No. 14/538,775, 63 pages.

Second Written Opinion dated Oct. 10, 2016 from PCT Patent Application No. PCT/US2015/060959, 7 pages.

Response filed Oct. 31, 2016 to the Final Office Action dated Jul. 29, 2016 from U.S. Appl. No. 14/588,138, 10 pages.

Notice of Allowability dated Oct. 24, 2016 from U.S. Appl. No. 14/555,184, 11 pages.

Corrected Notice of Allowability dated Oct. 31, 2016 from U.S. Appl. No. 14/555,184, 6 pages.

(56) References Cited

OTHER PUBLICATIONS

Response filed Nov. 28, 2016 to the Written Opinion dated Apr. 12, 2016 from PCT Patent Application No. PCT/US2016/013815, 10 pages.
Corrected Notice of Allowability dated Nov. 21, 2016 from U.S. Appl. No. 14/555,184, 6 pages.
Response filed Dec. 8, 2016 to the Second Written Opinion dated Oct. 31, 2016 from PCT Patent Application No. PCT/US2015/059799, 12 pages.
International Search Report and Written Opinion dated Nov. 14, 2016 from PCT Patent Application No. PCT/US2016/048898, 16 pages.
International Preliminary Report on Patentability dated Nov. 29, 2016 from PCT Patent Application No. PCT/US2015/064173, 63 pages.
Response filed Dec. 7, 2016 to the Second Written Opinion dated Oct. 10, 2016 from PCT Patent Application No. PCT/US2015/060959, 8 pages.
Supplemental Response filed Dec. 8, 2016 to the Response filed Jun. 30, 2016 from U.S. Appl. No. 14/538,786, 8 pages.
Applicant-Initiated Interview Summary dated Dec. 20, 2016 from U.S. Appl. No. 14/538,775, 3 pages.
Corrected Notice of Allowability dated Dec. 14, 2016 from U.S. Appl. No. 14/555,184, 6 pages.
Amended claims filed Dec. 22, 2016 from PCT Patent Application No. PCT/US2015/059798, 6 pages.
Notice of Allowance dated Dec. 27, 2016 from U.S. Appl. No. 14/538,786, 54 pages.
Notice of Allowance and Examiner-Initiated Interview Summary dated Jul. 10, 2017 from U.S. Appl. No. 14/538,775, 19 pages.
Communication pursuant to Rules 161(1) and 162 EPC dated Jun. 21, 2017 from European Patent Application No. 15797752.1, 2 pages.
Response filed Jul. 20, 2017 to the Communication pursuant to Rules 161(1) and 162 EPC dated Jun. 21, 2017 from European Patent Application No. 15797752.1, 6 pages.
Notice of Allowability dated Jul. 10, 2017 from U.S. Appl. No. 14/588,138, 6 pages.
Communication pursuant to Rules 161(1) and 162 EPC dated Aug. 8, 2017 from European Patent Application No. 15816331.1, 2 pages.
Article 34 Amendment filed Aug. 1, 2017 from Korean Patent Application No. 10-2017-7021309, 36 pages (No English Translation).
Applicant-Initiated Interview Summary dated Aug. 15, 2017 from U.S. Appl. No. 15/239,417, 3 pages.
Response filed Aug. 23, 2017 to the Non-Final Office Action dated May 25, 2017 from U.S. Appl. No. 15/239,417, 9 pages.
Communication pursuant to Rules 161(1) and 162 EPC dated Jul. 4, 2017 from European Patent Application No. 15801625.3, 2 pages.
Communication pursuant to Rules 161(1) and 162 EPC dated Jun. 21, 2017 from European Patent Application No. 15797753.9, 2 pages.
Article 34 Amendment filed Jun. 9, 2017 from Korean Patent Application No. 10-2017-7015834, 10 pages (No English Translation).
Final Office Action dated Jul. 19, 2017 from U.S. Appl. No. 14/866,697, 56 pages.
Demand filed Jun. 7, 2017 with Response to the International Search Report and Written Opinion from PCT Patent Application No. PCT/US2016/048898, 14 pages.
Second Written Opinion dated Aug. 1, 2017 from PCT Patent Application No. PCT/US2016/048898, 9 pages.
Notice of Allowability dated Sep. 1, 2017 from U.S. Appl. No. 14/588,138, 16 pages.
Notice of Allowance dated Sep. 12, 2017 from U.S. Appl. No. 15/239,417, 20 pages.
Corrected Notice of Allowability dated Sep. 26, 2017 from U.S. Appl. No. 15/239,417, 12 pages.
Response filed Sep. 13, 2017 to the Final Office Action dated Jul. 19, 2017 from U.S. Appl. No. 14/866,697, 11 pages.
Applicant Initiated Interview Summary dated Sep. 18, 2017 from U.S. Appl. No. 14/866,697, 3 pages.
Notice of Allowance dated Sep. 26, 2017 from U.S. Appl. No. 14/866,697, 13 pages.
International Search Report and Written Opinion dated Nov. 23, 2017 from PCT Patent Application No. PCT/US2017/051683, 15 pages.
Response filed Apr. 20, 2017 to the Non-Final Office Action dated Feb. 24, 2017 from U.S. Appl. No. 14/538,775, 9 pages.
Response filed Apr. 10, 2017 to the Non-Final Office Action dated Jan. 20, 2017 from U.S. Appl. No. 14/588,138, 8 pages.
Corrected Notice of Allowability dated Mar. 21, 2017 from U.S. Appl. No. 14/538,786, 10 pages.
Response filed Mar. 29, 2017 to the Non-Final Office Action dated Jan. 6, 2017 from U.S. Appl. No. 14/866,697, 10 pages.
Notice of Allowance dated May 18, 2017 from U.S. Appl. No. 14/588,138, 41 pages.
Non-Final Office Action dated May 25, 2017 from U.S. Appl. No. 15/239,417, 71 pages.
International Preliminary Report on Patentability dated Apr. 4, 2017 from PCT Patent Application No. PCT/US2016/013815, 9 pages.
International Preliminary Report on Patentability dated Jan. 2, 2018 from PCT Patent Application No. PCT/US2016/048898, 20 pages.
International Preliminary Report on Patentability dated Mar. 3, 2017 from PCT Patent Application No. PCT/US2015/060959, 7 pages.
Corrected Notice of Allowability dated Mar. 16, 2017 from U.S. Appl. No. 14/555,184, 8 pages.
"360 deg Hinge Video", Retrieved From: https://www.youtube.com/watch?v=lhEczMi4nsw, Jul. 21, 2013, 1 Page.
"Special Purpose Hinges (cont.)", Retrieved From: http://hingedummy.info/specialpurposepage2.htm, Jan. 4, 2007, 2 Pages.
"Non Final Office Action Issued in U.S. Appl. No. 15/256,302", dated Jun. 9, 2017, 12 Pages.
"Final Office Action Issued in U.S. Appl. No. 15/360,652", dated May 3, 2018, 8 Pages.
"Non Final Office Action Issued in U.S. Appl. No. 15/360,652", dated Oct. 6, 2017, 10 Pages.
Smith, Daria, "Microsoft Helps HP Design New Convertible Spectre x360", Retrieved From: http://blog.parts-people.com/2015/03/03/microsoft-helps-hp-design-ne-convertible-spectre-x360, Mar. 3, 2015, 1 Page.
"Non Final Office Action Issued in U.S. Appl. No. 15/360,652", dated Oct. 2, 2018, 7 Pages.

\* cited by examiner

MULTI-PIVOT HINGE

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, wherever practical, the left-most numeral of each reference number conveys the FIG. and associated discussion where the reference number is first introduced.

DESCRIPTION

The present concepts relate to computing devices employing multi-pivot or multi-axis hinge assemblies to rotatably secure portions of the computing device. The present hinges can be thought of as sequential hinges in that the multi-pivot hinge assemblies can control a relative order in which individual hinges rotate. One such configuration can cause the hinges to operate in a predefined order from first to last (e.g., sequentially). As such, the multi-pivot hinge assemblies can be termed 'sequential multi-pivot hinge assemblies'.

Figures 1, 2:
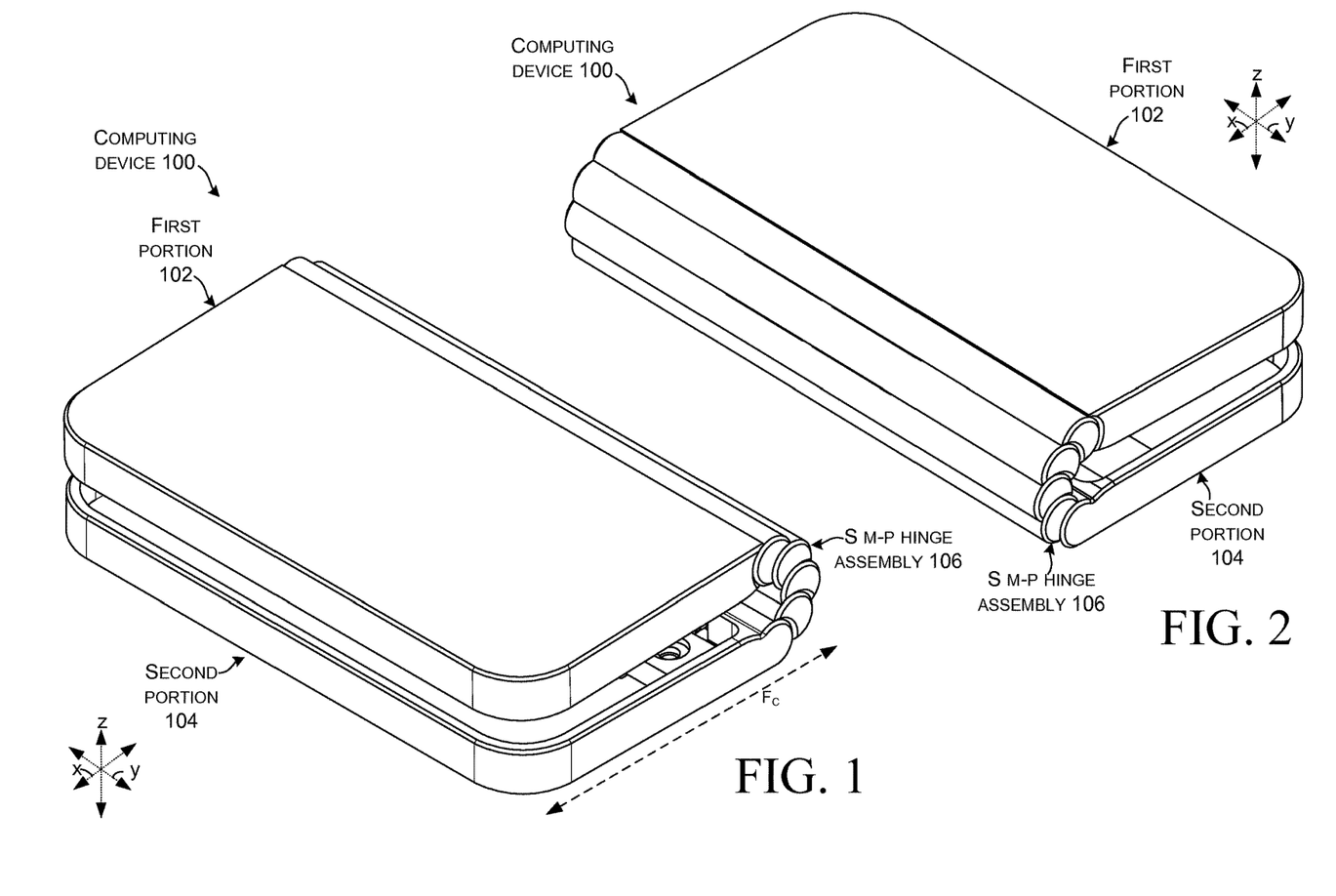
FIGS. 1-4 show perspective views of example devices that include sequential multi-pivot hinge assembly examples in accordance with some implementations of the present concepts.
Figure 3:
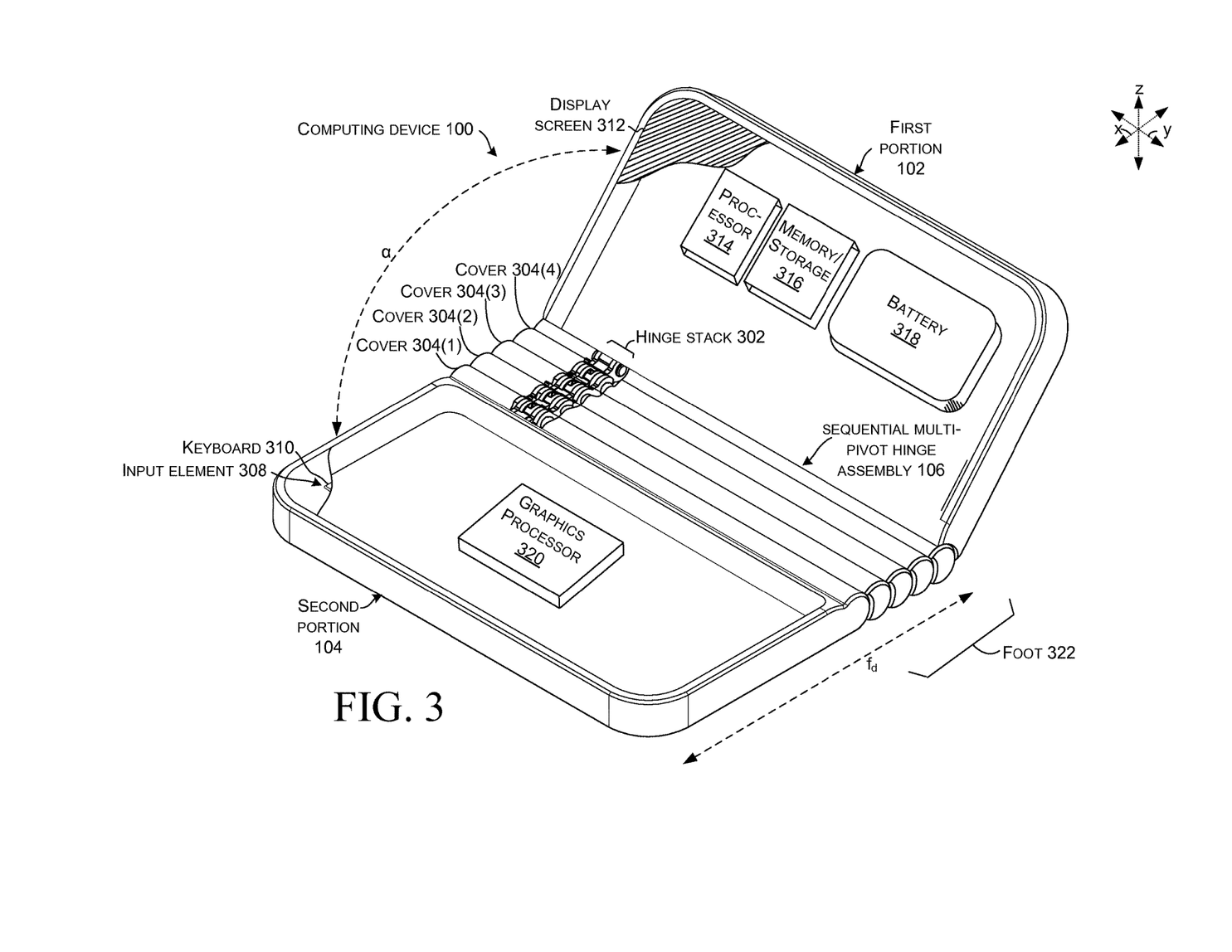

Introductory FIGS. 1-3 collectively show an example of a computing device 100. In this example, computing device 100 has first and second portions 102 and 104 that are rotatably secured together by a sequential multi-pivot hinge assembly 106. FIGS. 1-2 show the computing device in a 'closed' position. FIG. 1 shows the computing device 100 from the 'front' and FIG. 2 shows the computing device from the 'back.' FIG. 3 is a partial cut-away perspective view that shows the computing device in an 'open' or 'deployed' position. In this example, in the deployed position, the first and second portions can define an obtuse angle α relative to one another, as opposed to an angle close to zero in the closed position of FIGS. 1-2. In other implementations, the deployed position can be 90 degrees or less or 180 degrees or more (e.g., a book like configuration) or up to 360 degrees. For instance, the deployed position may be somewhere in the range of 90 degrees to 180 degrees that is a comfortable viewing angle for the user.

As can be appreciated from FIG. 3, the sequential multi-pivot hinge assembly 106 can include one or more hinge stacks 302. Aspects of the sequential multi-pivot hinge assembly 106 are described in more detail below relative to FIGS. 5-10. In this example, the sequential multi-pivot hinge assembly includes rigid articulating hinge covers 304 that can obscure and/or protect the underlying elements, including the hinge stacks 302. Other implementations do not include the rigid articulating covers. Still other implementations can include a flexible hinge cover that extends between the first portion 102 and the second portion 104 over the sequential multi-pivot hinge assembly 106.

As evidenced in FIG. 3, computing device 100 can also include an input element or device 308. In this case the input device 308 is manifest as a keyboard 310. Other implementations can employ other input devices. In this example, the computing device can also include a display screen 312, such as a touch sensitive display screen. The computing device can also include a processor 314, memory/storage 316, a battery 318, and/or a video or graphics processor 320, among other components/elements. These elements can be positioned in the first portion 102 and/or second portion 104.

In this case, the second portion 104 can be configured to be positioned on a generally horizontal surface (not specifically designated), such as a table top. In the closed position of FIGS. 1-2, the first and second portions are generally parallel to one another and the horizontal surface (e.g., the first portion is juxtaposed over the second portion). In contrast, in the deployed position of FIG. 3, the first portion is rotated away from the second portion, in this case to an obtuse angle.

Note that in the closed position of FIGS. 1-2, the sequential multi-pivot hinge assembly 106 can provide a footprint $f_c$ that is compact and easy to carry. Note also, that in this implementation the progressive or sequential nature of the sequential multi-pivot hinge assembly 106 can increase or expand the footprint of the computing device when the device is transitioned from the closed or storage position of FIGS. 1-2 to the open or deployed position of FIG. 3. For example, compare the closed footprint $f_c$ to the deployed or expanded footprint $f_d$ of FIG. 3. This extended footprint feature can be especially valuable in this implementation where some or all of the electronic components, such as the display 312, processor 314, memory/storage 316, and battery 318 are positioned in the first portion 102. The extended footprint provided by the sequential multi-pivot hinge assembly 106 can increase stability of the computing device 100 and reduce the likelihood of the device tipping over backward in the deployed position from the weight of these components. Stated another way, the sequential nature of the sequential multi-pivot hinge assembly 106 can create a foot 322 in the deployed position that can help stabilize the computing device 100 and decrease tipping (e.g., maintain the center of mass over the footprint).

In the implementation shown in FIG. 3, the sequential multi-pivot hinge assembly 106 can be secured to the first and second portions 102 and 104 in a relatively permanent manner (e.g., in a manner that is not intended to be readily separable by an end use consumer). Alternatively, the sequential multi-pivot hinge assembly 106 can be secured to the first and second portions 102 and 104 in a relatively quickly attachable/detachable manner (e.g., in a manner that is intended to be readily separable by the end use consumer). One such example of this latter configuration is shown in FIG. 4.

Figure 4:
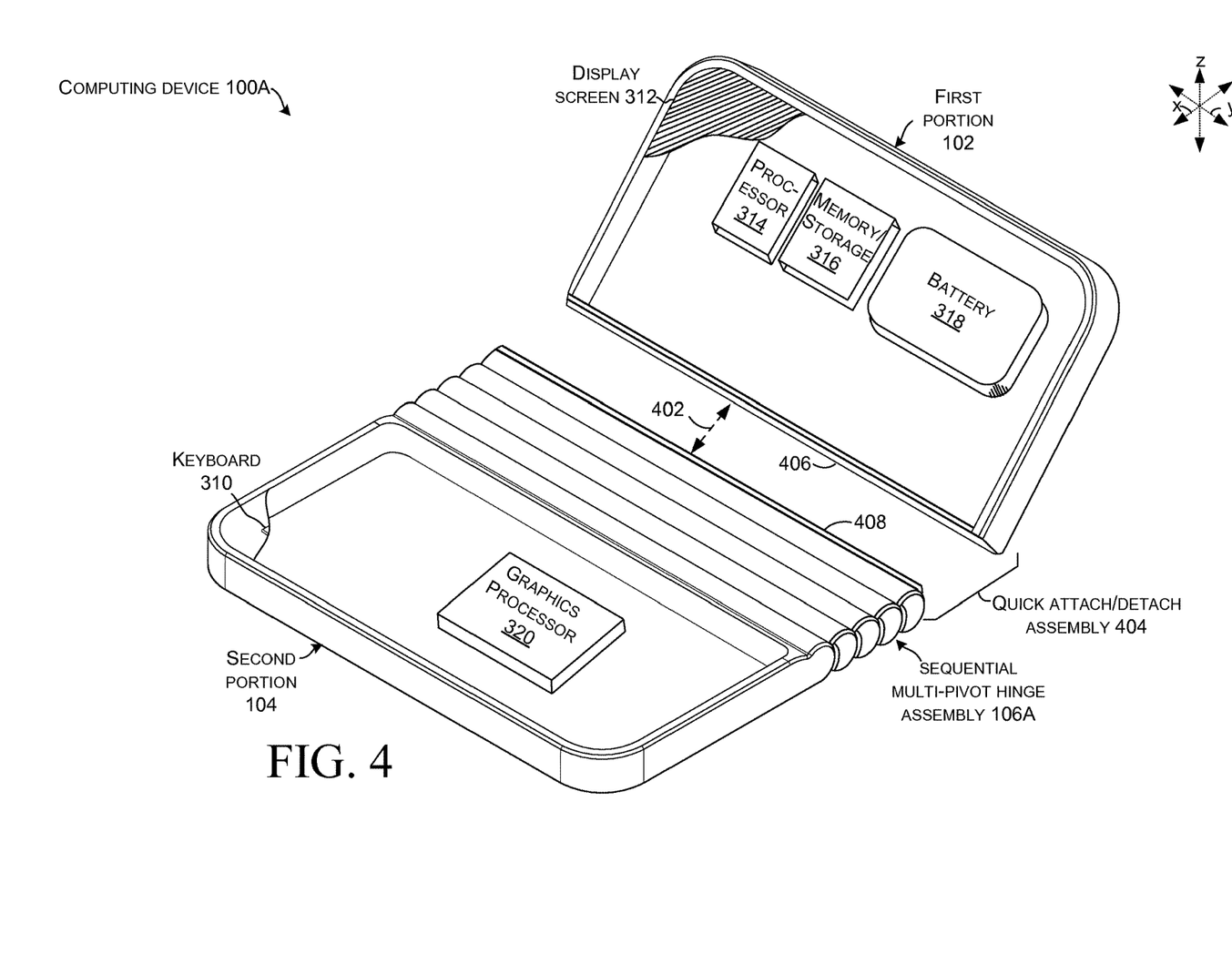

FIG. 4 shows another computing device 100A in a view that is similar to the view of FIG. 3. In this example, the sequential multi-pivot hinge assembly 106A is configured to allow an end use consumer to easily detach either or both of the first and second portions 102 and 104 from the sequential multi-pivot hinge assembly 106A as indicated by arrow 402. In this example the sequential multi-pivot hinge assembly 106A can include a quick attach/detach assembly 404. The quick attach/detach assembly 404 may include cooperatively operating elements 406 and 408 located on the first portion 102 and the sequential multi-pivot hinge assembly 106A. Elements 406 and 408 can function to couple the first portion 102 to the sequential multi-pivot hinge assembly 106A. Similar elements can function to couple the second portion 104 to the sequential multi-pivot hinge assembly 106A.

In one example, element 406 can be manifest as a mechanical latch and element 408 can be manifest as a receiver. The latch can engage the receiver to removeably couple the first portion 102 with the sequential multi-pivot hinge assembly 106A. In another example, the elements 406 and 408 may magnetically couple to one another in a manner that can be overcome by the user to separate the first portion from the sequential multi-pivot hinge assembly 106A. Other quick attach/detach assemblies 404 are contemplated. The sequential multi-pivot hinge assembly 106A may detachably connect with either or both of the first and/or second portions. Alternatively or additionally to mechanical coupling, the quick attach/detach assembly 404 can detachably electrically couple electronic components of the first and second portions. For instance, the quick attach/detach assembly 404 may electrically couple/decouple processor 314, storage/memory 316, and/or battery 318 from the first portion 102 to the graphics processor 320 and/or keyboard 310 in the second portion 104.

Thus, the quick attach/detach assembly 404 can allow the user to be able to detach first portion 102 or second portion 104 to use either portion independently of the other. For example, first portion 102 may be operated as a stand-alone tablet device, and then may be attached to second portion 104 via sequential multi-pivot hinge assembly 106A to form a device more akin to a laptop device. A user may also be able to exchange first portion 102 or second portion 104 for application-specific devices. For example, an individual second portion may include a keyboard and/or a touchscreen. In certain scenarios, the user may attach a first touchscreen as the first portion and a second touchscreen as the second portion, and utilize the device like a book. In other scenarios, a user may attach a touchscreen as the first portion and an input device, manifest as a keyboard and trackpad, as the second portion, and utilize the device like a laptop. Other configurations and implementations are contemplated.

Figure 5:
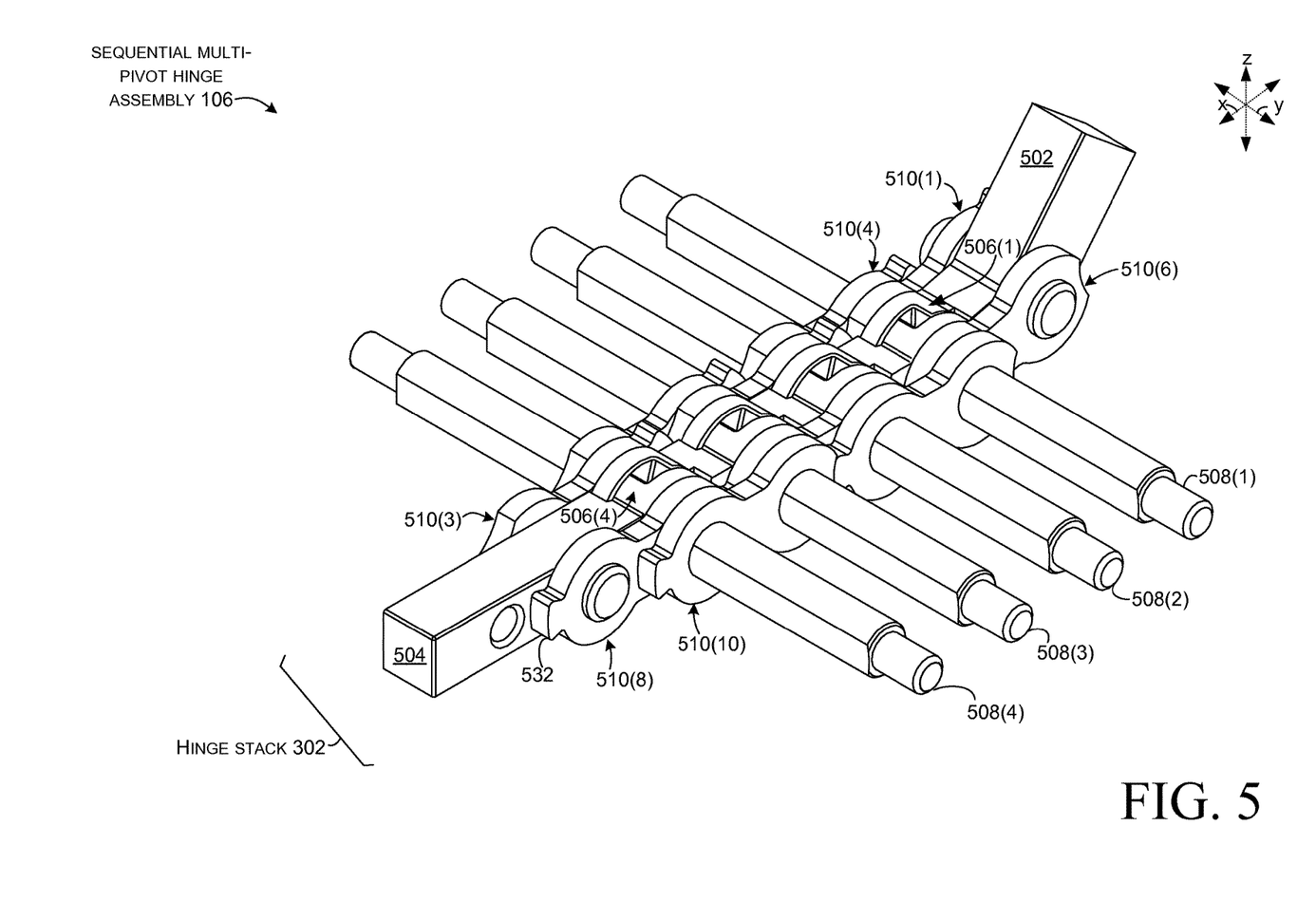
FIGS. 5-6 are perspective views of a sequential multi-pivot hinge assembly example in the deployed and storage positions respectively.
Figure 6:
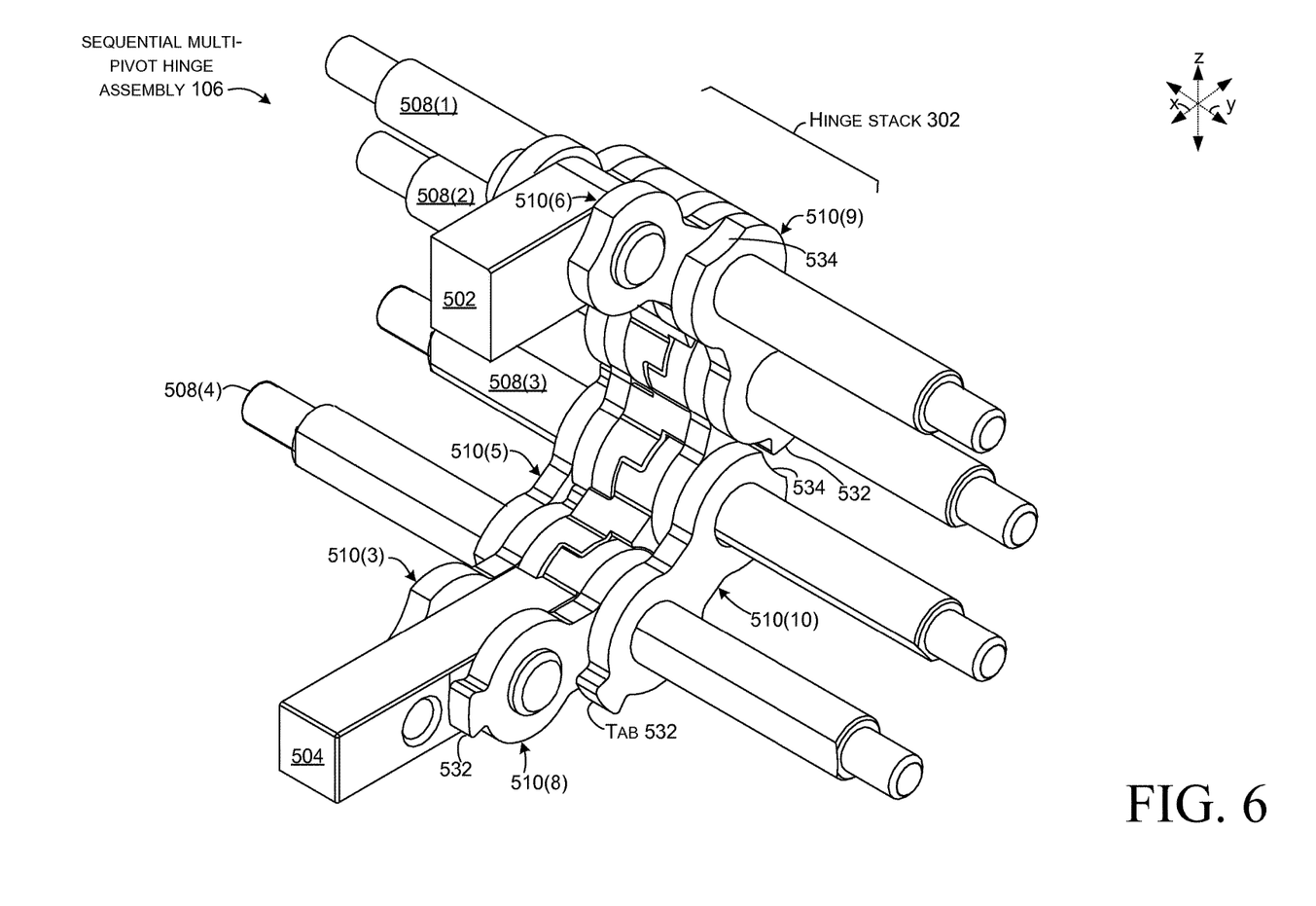

FIGS. 5-11 illustrate more details about the example sequential multi-pivot hinge assembly 106 including an example hinge stack 302 introduced above relative to FIG. 3. Note that due to space constraints on the drawing pages, not all elements are labeled in each FIG. and not every instance of every element is labeled, rather representative elements are labeled. FIG. 5 shows the sequential multi-pivot hinge assembly 106 in an open or deployed position similar to FIG. 3. FIG. 6 shows sequential multi-pivot hinge assembly 106 in a closed or storage position similar to FIG. 1. FIGS. 7-10 show exploded views of sequential multi-pivot hinge assembly 106 in a sequence from open in FIG. 7, partially closed in FIG. 8, further closed in FIG. 9, and fully closed in FIG. 10.

Figure 7:
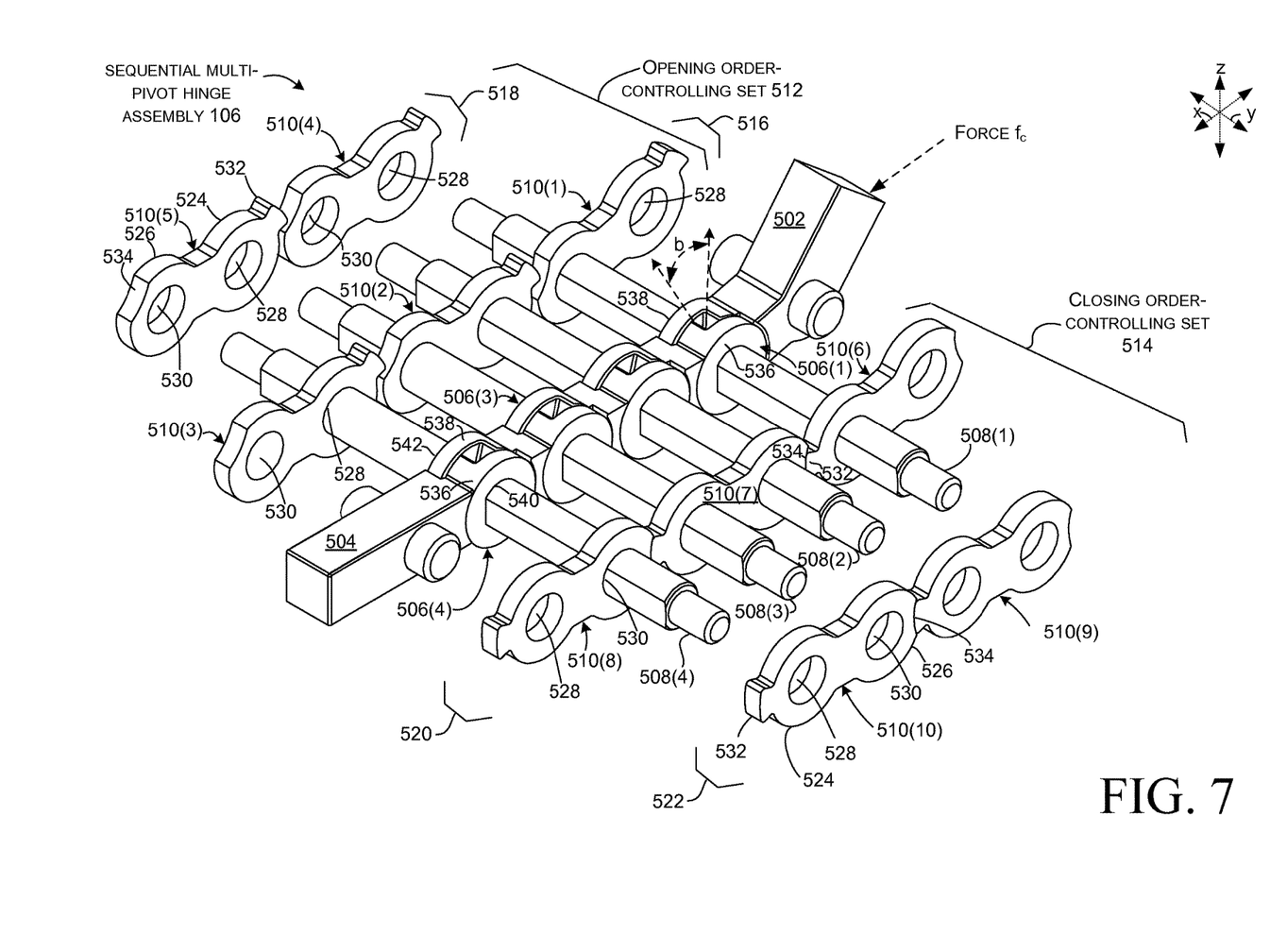
FIGS. 7-11 are exploded perspective views of the sequential multi-pivot hinge assembly example of FIG. 5-6.

Referring collectively to FIGS. 5-10, the example hinge stack 302 can include a first portion element (e.g., interface) 502 for securing the hinge stack 302 to the first portion 102 (FIG. 1) and a second portion element (e.g., interface) 504 for securing the hinge stack 302 to the second portion 104 (FIG. 1). Hinge stack 302 can also include rotation control elements, such as rotation limiters 506, shafts 508, and cammed links 510. The hinge stack 302 can include an opening order-controlling set 512 (FIG. 7) and a separate closing order-controlling set 514 (FIG. 7). In this implementation opening order-controlling set 512 can include links 510(1)-510(5) while closing order-controlling set 514 can include links 510(6)-510(10).

In this case, the opening order-controlling set 512 can be further organized into first and second subsets 516 and 518. The first subset 516 can include links 510(1)-510(3) and the second subset 518 can include links 510(4)-510(5). The closing order-controlling set 514 can be further organized into first and second subsets 520 and 522. The first subset 520 can include links 510(6)-510(8) and the second subset 522 can include links 510(9)-510(10). Within an individual subset, links can be arranged in an end-to-end manner. This facet allows interaction between adjacent links of an individual subset as will be described below.

Links 510 can include first and second portions 524 and 526 (FIG. 7). Relative to an individual link, an individual first portion 524 can define a first passageway 528 and second portion 526 can define a second passageway 530. Individual links can also include a cam tab (e.g., tab) 532 and a cam tab engagement surface (e.g., engagement surface) 534. In the illustrated configuration, the links 510 can be thought of as approximating a figure-eight shape with the tab 532 on the first portion 524 and the engagement surface 534 on the second portion 526.

Note further, that the links 510 of the opening order-controlling set 512 can be different from the links of the closing order-controlling set 514. For instance, relative to an individual link, in the illustrated closing order-controlling set 514, the engagement surface 534 is generally opposite (e.g. about 180 degrees) from the tab 532. In contrast, in the links of the opening order-controlling set 512, the tab 532 is offset from the engagement surface (e.g., a line passing through the center of the first and second passageways 528 and 530 does not pass through a center of the tab 532 and/or the engagement surface 534).

Relative to an individual link set, such as opening order-controlling set 512, links of the first subset 516 can be offset one hinge axis from links of the second subset 518 so that an individual shaft 508 passes through first passageway 528 of an individual link in the first subset and second passageway 530 of an individual link in the second subset. For instance, shaft 508(4) passes through first passageway 528 of link 510(3) from the first subset 516 and second passageway 530 of link 510(5) of the second subset 518. Stated another way, within an individual link set, links can be offset by one hinge axis relative to the first subset and the second subset.

Note that in this implementation, the shafts 508 do not have a circular profile when viewed transverse their long axis (e.g., when viewed along the xz reference plane). Instead, in this case, the shafts have a profile that approximates a capital "D". The links' first passageway 528 and second passageway 830 both have a circular profile so that the shaft can turn freely within the passageways. In contrast, the rotation limiters 506 can include a first portion 536 and a second portion 538 (FIG. 7, relative to rotation limiter 506(4)). The first portion 536 can define a first passageway 540 and the second portion 538 can define a second passageway 542 (FIG. 7, relative to rotation limiter 506(4)). The rotation limiters' first passageway 540 can have a D shaped profile (e.g., the shape of the shaft is keyed into a fixed orientation with the first portion 536). This configuration can allow the second portion to rotate around the keyed shaft while preventing the first portion from rotating around the keyed shaft.

Other keyed shaft profiles can be utilized that cause the keyed shaft to be non-rotatable relative to individual passageways and rotatable relative to other individual passageways. For instance, a star shaped profile could be utilized where the first portion's passageway 540 matches the star profile and the second portion's passageway 542 is circular with a diameter defined by the outer points of the star. From a functional standpoint, the first portion 536 and the second portion 538 can define the angle of rotation b around an individual shaft (e.g., hinge axis, pivot axis, or axis of rotation) (see FIG. 7).

As mentioned above, the closing order-controlling set 514 can control the order of rotation around individual shafts 508. For instance, starting at the open position of FIG. 7, the user can apply a closing force $f_c$ on the first portion element 502. The closing force can cause counter-clockwise rotation around shaft 508(1). This movement turns tab 532 of link 510(6) away from engagement surface 534 of link 510(7) (compare FIG. 7 to FIG. 8). Rotation can continue through a range of degrees of rotation (e.g., angle b) as defined by the rotation limiter 506(1) associated with shaft 508(1). During this initial phase rotation around the other shafts 508(2)-508 (4) is collectively blocked by the inter-relationships of the tabs and engagement surfaces of the remaining links 510 (7)-510(10) of the closing order controlling set 514.

Figure 8:
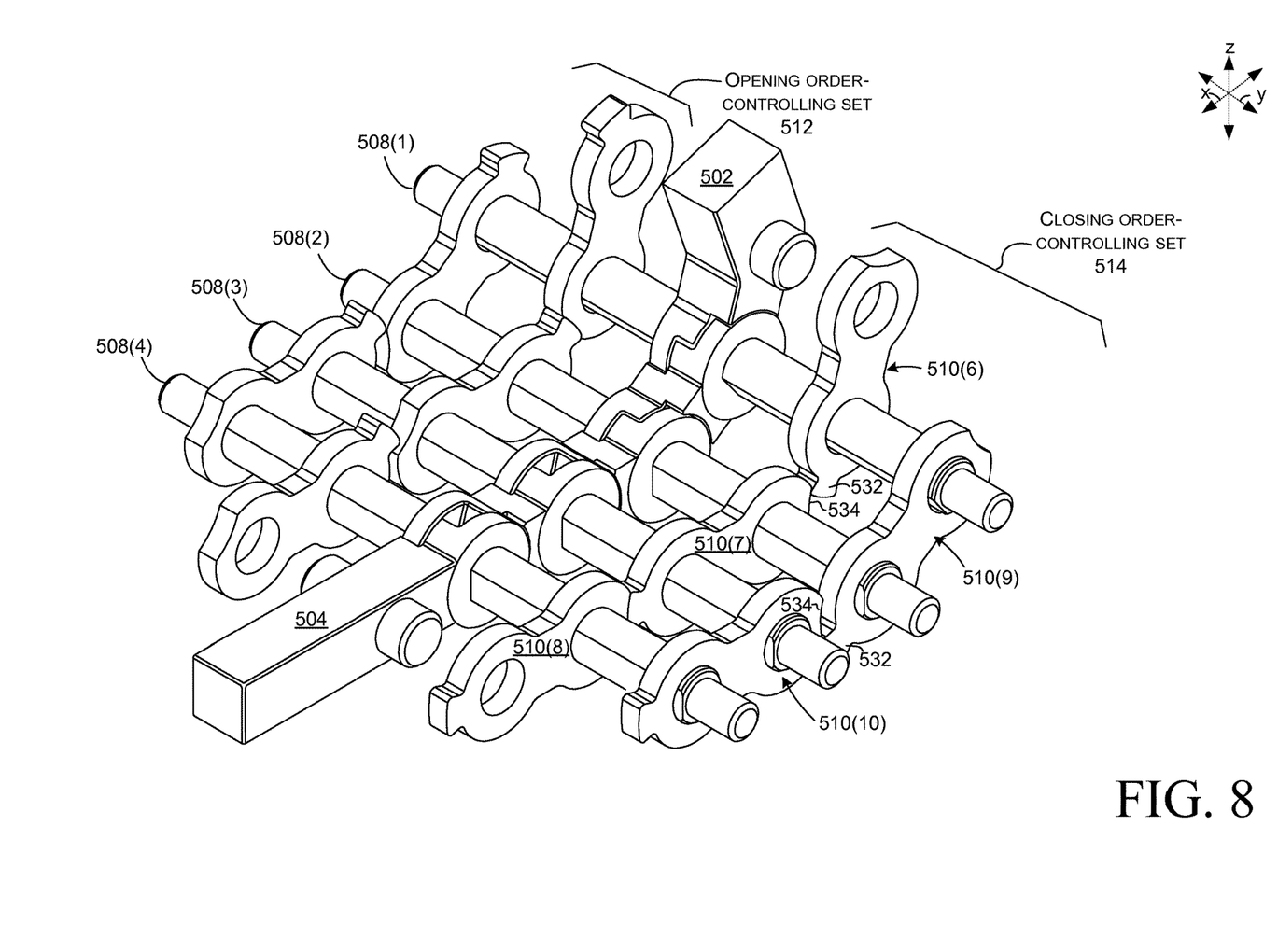

Once rotation is completed around shaft 508(1) (e.g., tab 532 of link 510(6) disengages from engagement surface 534 of link 510(7), see FIG. 8), the closing force can begin rotation around shaft 508(2) while the first portion element 502 (and shaft 508(1)) move in the negative x direction. This counter-clockwise rotation around shaft 508(2) can rotate tab 532 of link 510(9) away from engagement surface 534 of link 510(10) (compare FIG. 7, FIG. 8, and FIG. 9). This process can be serially repeated for shaft 508(3). For instance, in relation to FIG. 8, rotation around shaft 508(2) has already been completed and rotation around shaft 508(3) is possible because cam tab 532 of link 510(9) has disengaged from engagement surface 534 of link 510(10). Rotation around shaft 508(4) is still not possible because of interaction between link 510(7) and link 510(8). However, at the position of FIG. 9, rotation around shaft 508(4) can commence as rotation around shaft 508(3) is already complete thereby disengaging the cam tab (not specifically designated) of link 510(7) from link 510(8).

Figure 9:
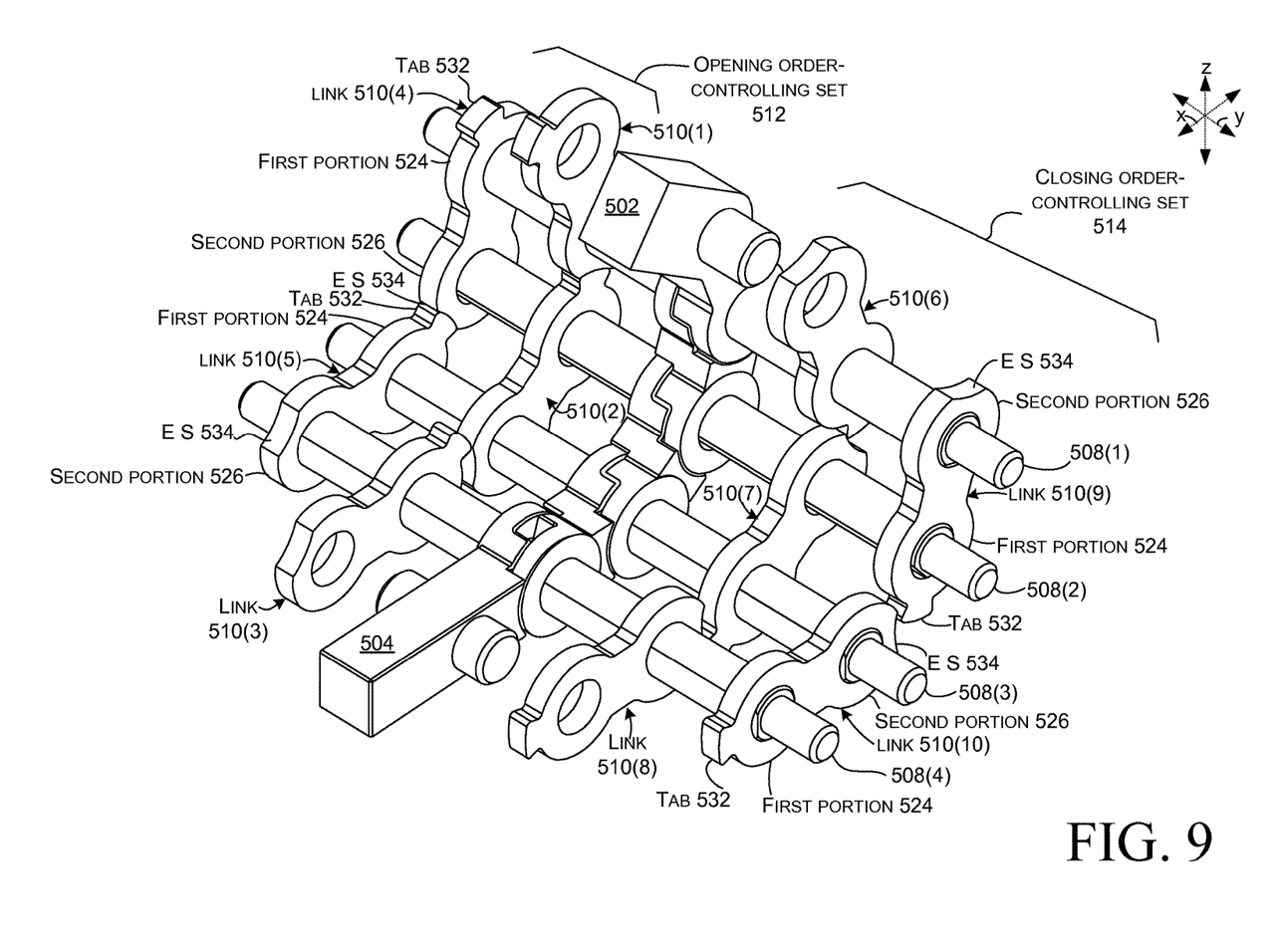
Figure 10:
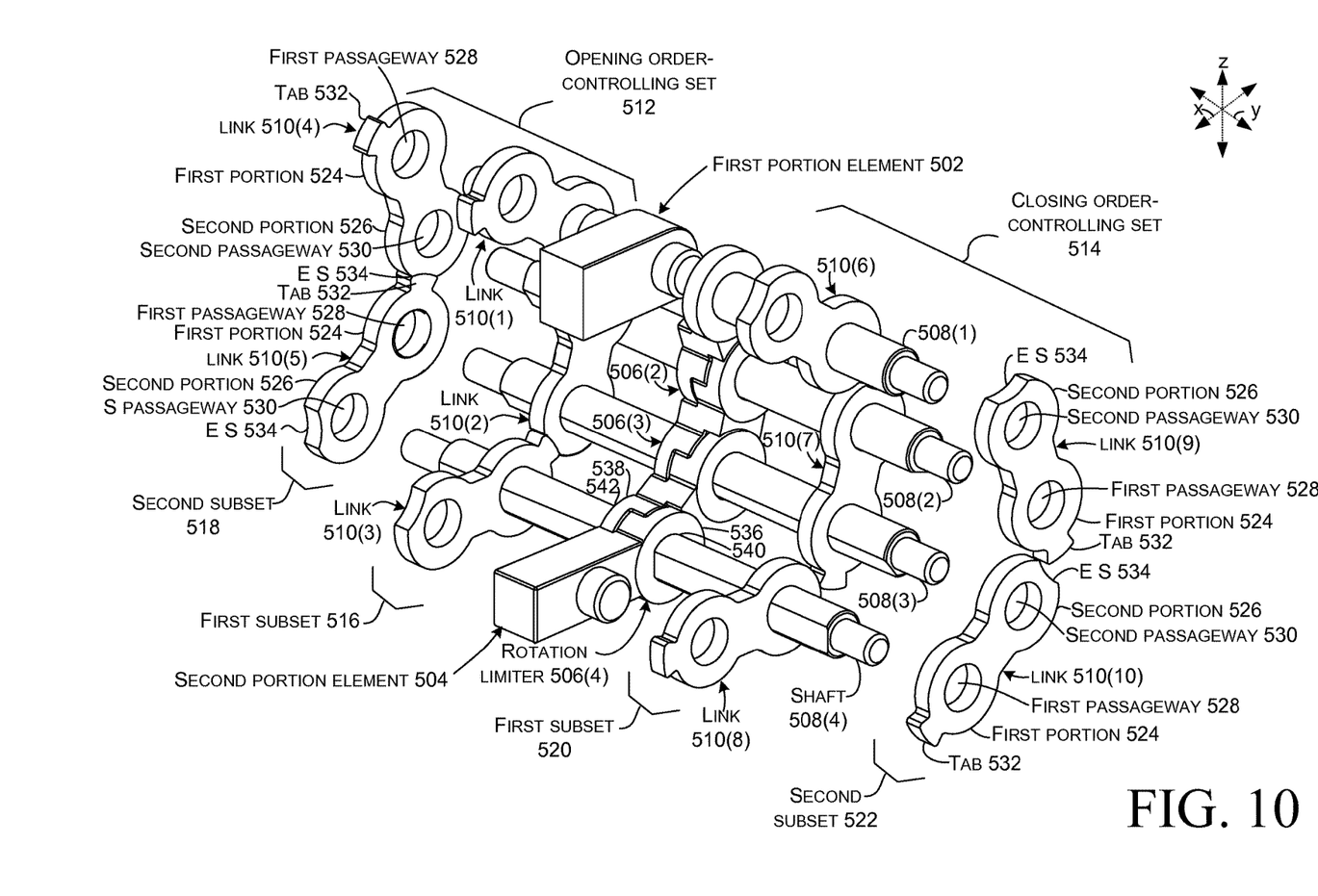
Figure 11:
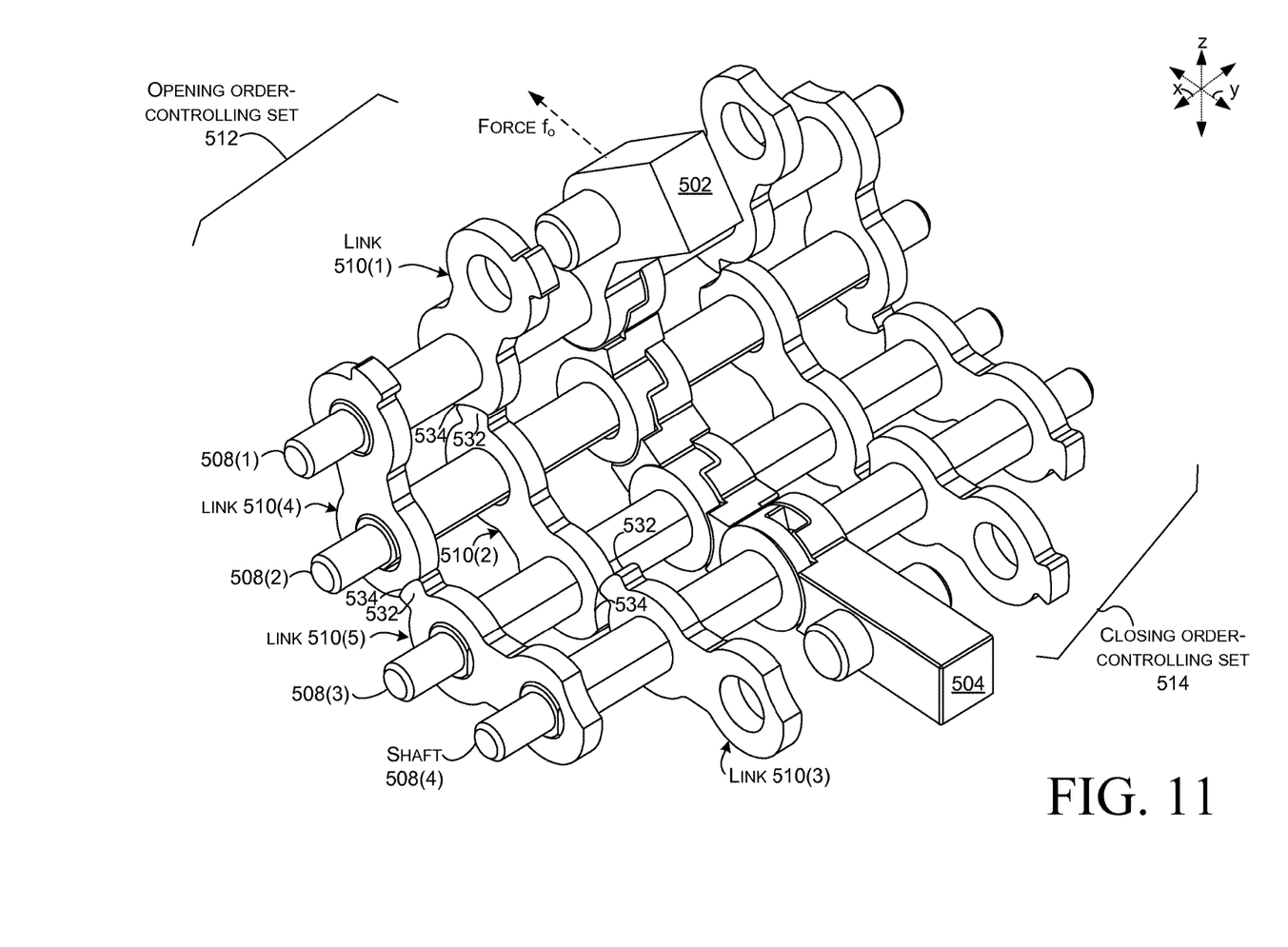

FIG. 11 is an intermediate position similar to FIG. 9 but with the opening order-controlling set 512 in the foreground rather than the closing order-controlling set 514 of FIG. 9. If the user applies an opening force $f_o$, rotation can commence around shaft 508(3). Rotation around shaft 508(3) clears cam tab 532 of link 501(5) from engagement surface 534 of link 510(4) and allows rotation around shaft 508(3). Similarly, rotation around shaft 508(2) is blocked by engagement between link 510(5) and link 510(4) and rotation around shaft 508(1) is blocked by engagement of link 510(2) with link 510(1). The rotation process can be repeated sequentially along the individual shafts 508.

Viewed from one perspective, in some implementations if the tab and engagement surface on two engaged links are both concentric to a given axis of rotation, then the links can rotate with respect to one another. If they do not share a common axis of rotation and their cam tab and engagement surface are engaged, then the links are locked with respect to each other as rotation would cause the tab in one link to crash into the engagement surface of the other link.

Example Methods

Various methods of manufacture, assembly, and use for sequential multi-pivot hinge assemblies are contemplated beyond those shown above relative to FIGS. 1-11.

Additional Examples

Various examples are described above. Additional examples are described below. One example is manifest as a first portion and a second portion. This example also includes a sequential multi-pivot hinge assembly rotatably securing the first portion and the second portion from a storage position where the first portion is juxtaposed over the second portion to a deployed position where the first portion is oriented at an obtuse angle relative to the first portion. The sequential multi-pivot hinge assembly can include a first set of cammed links to control an order of rotation around individual hinge axes when the first portion and second portion are being rotated from the storage position to the deployed position and a separate second set of cammed links to control the order of rotation from the deployed position to the storage position.

Any combination of the above and/or below examples where the first set of cammed links comprises a first subset of links that are arranged end-to end with one another and a second subset of links that are arranged end-to-end with one another. The first subset of links are offset one hinge axis from the second subset of links.

Any combination of the above and/or below examples where individual links have first and second regions. Individual links of the first set of links are arranged in an end-to-end manner so that the first region of a first individual link interacts with the second region of a second individual link.

Any combination of the above and/or below examples where the individual links comprise a tab on the first region and an engagement surface on the second region, and wherein interaction of the tab of a first individual link and the engagement surface of an adjacent individual link controls rotation around an individual hinge axis passing through the individual link.

Any combination of the above and/or below examples where the sequential multi-pivot hinge assembly further comprises hinge shafts that define the hinge axes.

Any combination of the above and/or below examples where the hinge shafts have a circular profile when viewed transverse an axis of rotation or wherein the shaft is not circular.

Any combination of the above and/or below examples further including rotation control elements that define an angle of rotation around an individual axis of rotation.

Any combination of the above and/or below examples where the rotation control elements comprise a first portion that is configured to rotate around an individual hinge shaft and a second portion that is non-rotatably secured to the individual hinge shaft.

Any combination of the above and/or below examples where the sequential multi-pivot hinge assembly is configured to create a larger footprint of the computing device in the deployed position than in the storage position.

Any combination of the above and/or below examples where the sequential multi-pivot hinge assembly is visible in both the storage position and the deployed position.

Any combination of the above and/or below examples where the first portion includes a touchscreen and the second portion includes a keyboard or a touchscreen.

Any combination of the above and/or below examples where the hinge cover comprises multiple rigid hinge covers or wherein the hinge cover comprises a flexible hinge cover that extends from the first portion to the second portion.

Any combination of the above and/or below examples where the deployed position is about 90 degrees to about 360 degrees from the storage position Another example is manifest as a first portion and a second portion. The example can include a sequential multi-pivot hinge assembly rotatably securing the first portion and the second portion and including a first set of links configured to control a relative order of rotation around individual axes of rotation of the sequential multi-pivot hinge assembly when the first and second portions are being rotated away from one another and a second different set of links configured to control the relative order of rotation around the individual axes of rotation of the sequential multi-pivot hinge assembly when the first and second portions are being rotated toward one another.

Any combination of the above and/or below examples where at least some of the links are cammed links comprising a cam tab and a cam engagement surface.

Any combination of the above and/or below examples where all of the cammed links of the first set have a same geometric shape as the cammed links of the second set or wherein the cammed links of the first set have a different geometric shape as the cammed links of the second set.

Any combination of the above and/or below examples where the cammed links have a same geometric shape or wherein individual cammed links have different geometric shapes from one another.

Any combination of the above and/or below examples where the second portion defines a footprint of the computing device when the first portion is juxtaposed over the second portion in a storage position and when the first portion is rotated away from the second portion the sequential multi-pivot hinge assembly expands the footprint.

Any combination of the above and/or below examples further including electronic components positioned in the first portion and wherein a center of mass of the computing device is located above the expanded footprint.

Another example is manifest as a hinge having a first interface and a second interface. The example can include a sequential multi-pivot hinge assembly rotatably securing the first interface and the second interface and including a first set of elements to control rotation around individual axes starting proximate to the second interface when rotating the first and second interfaces apart and a second set of elements to control rotation starting proximate to the first interface when moving the first and second interfaces toward one another.

Any combination of the above and/or below examples where the first interface includes an electrical connector and a mechanical latch.

CONCLUSION

Although techniques, methods, devices, systems, etc., pertaining to sequential multi-pivot hinge assemblies are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A computing device, comprising:
a first portion and a second portion; and,
a sequential multi-pivot hinge assembly rotatably securing the first portion and the second portion from a storage position where the first portion is juxtaposed over the second portion to a deployed position where the first portion is oriented at an obtuse angle relative to the first portion, the sequential multi-pivot hinge assembly comprising:
a first set of cammed links including cam tabs that are offset from a longitudinal axis of the cammed links and that control a sequential order of rotation about multiple hinge axes such that when the first portion and the second portion are being rotated from the storage position to the deployed position, rotation around a first individual hinge axis is completed before rotation around a second individual hinge axis begins, and
a separate second set of cammed links including cam tabs that are in line with the longitudinal axis such that the cam tabs of the cammed links of the separate second set have a different location on the cammed links than a location of the cam tabs on the cammed links of the first set, and the separate second set of cammed links control a reverse sequential order of rotation such that when the first portion and the second portion are being rotated from the deployed position to the storage position, rotation around the second individual hinge axis is completed before rotation around the first individual hinge axis begins.

2. The computing device of claim 1, wherein the first set of cammed links comprises a first subset of links that are arranged end-to end with one another and a second subset of links that are arranged end-to-end with one another, and wherein the first subset of links are offset one hinge axis from the second subset of links.

3. The computing device of claim 1, wherein individual cammed links comprise first and second portions, and wherein first individual cammed links of the first set of cammed links are arranged in an end-to-end manner so that a respective first portion of a first individual cammed link interacts with a respective second portion of a second individual cammed link.

4. The computing device of claim 3, wherein the cam tabs of the first set comprise a single cam tab on the first portion of each individual link, and each individual link further comprises an engagement surface on the second portion, and wherein interaction of the single cam tab of a first individual link and the engagement surface of an adjacent individual link prevents rotation around an adjacent hinge axis passing through the adjacent individual link until rotation around the individual hinge axis associated with the first individual link is completed.

5. The computing device of claim 1, wherein the sequential multi-pivot hinge assembly further comprises hinge shafts that define the hinge axes.

6. The computing device of claim 5, wherein the hinge shafts have a circular profile when viewed transverse an axis of rotation or wherein the hinge shafts are not circular.

7. The computing device of claim 1, further comprising rotation limiters that define an angle of rotation around an individual axis of rotation.

8. The computing device of claim 7, wherein the rotation limiters comprise a first portion that is non-rotatably secured to an individual hinge shaft and a second portion that is rotatably secured to the individual hinge shaft.

9. The computing device of claim 1, wherein the computing device has a larger footprint in the deployed position than in the storage position.

10. The computing device of claim 9, wherein the sequential multi-pivot hinge assembly is visible when the computing device is in both the storage position and the deployed position.

11. The computing device of claim 1, wherein the first portion includes a touchscreen and the second portion includes a keyboard or another touchscreen.

12. The computing device of claim 1, further comprising multiple rigid hinge covers or further comprising a hinge cover that extends from the first portion to the second portion.

13. The computing device of claim 1, wherein the deployed position is in a range from 90 degrees to 360 degrees from the storage position.

14. A computing device, comprising:

a first portion and a second portion; and, a sequential multi-pivot hinge assembly rotatably securing the first portion and the second portion and comprising:

a first set of cammed links including cam tabs that are offset from a longitudinal axis of the links and are configured to effect a relative order of rotation around individual axes of rotation of the sequential multi-pivot hinge assembly when the first and second portions are being rotated away from one another, and a second different set of cammed links including cam tabs that are in line with the longitudinal axis and are configured to effect a reverse relative order of rotation around the individual axes of rotation of the sequential multi-pivot hinge assembly when the first and second portions are being rotated toward one another, wherein at least some of the cammed links further comprise a cam engagement surface, and wherein a first location of a first cam tab and a first cam engagement surface on a first individual cammed link of the first set is different than a second location of a second cam tab and a second cam engagement surface on a second individual cammed link of the second set.

* * * * *